Patented Jan. 8, 1952

2,581,369

UNITED STATES PATENT OFFICE 2,581,369

OXYETHYLATED HYDROPHILE DERIVATIVES OF CERTAIN FRACTIONAL ESTERS OF TRIRICINOLEIN

Melvin De Groote, University City, and Bernhard Keiser, Webster Groves, Mo., assignors to Petrolite Corporation, Ltd., Wilmington, Del., a corporation of Delaware No Drawing. Application May 29, 1948, Serial No. 30,185

9 Claims. (Cl. 260—404.8)

This invention relates to a new chemical product or compound, our present application being a continuation-in-part of our co-pending abandoned application Serial No. 758,488, filed July 1, 1947, which was, in turn, a division of our co-pending application Serial No. 666,820, filed May 2, 1946, now abandoned.

Complementary to the above aspect of our invention is our companion invention concerned with the new chemical products or compounds used as demulsifying agents in the resolution of water-in-oil emulsions, particularly petroleum emulsions, as described in our co-pending application Serial No. 30,187, filed May 29, 1948 now Patent No. 2,498,657.

The new products herein described are also useful as wetting, detergent and leveling agents in the laundry, textile and dyeing industries; as wetting agents and detergents in the acid washing of fruit; in the acid washing of building stone and brick; as wetting agents and spreaders in the application of asphalt in road building and the like: as a constituent of soldering flux preparations; as a flotation reagent in the flotation separation of various aqueous suspensions containing negatively charged particles such as sewage, coal washing waste water, and various trade wastes and the like; as germicides, insecticides, emulsifying agents, as, for example, for cosmetics, spray oils, water-repellent textile finishes; as lubricants, etc.

Briefly stated, the new compounds herein contemplated, and which, in addition to being desirable as demulsifying agents for petroleum emulsions of the water-in-oil type are also useful for other purposes, are obtained by the oxyethylation of certain fractional esters obtained from ricinoleic acid, glycerol and polycarboxy acids. Such esters are characterized by the fact that the number of ricinoleic acid radicals present is less than the number of hydroxyl radicals attached to the glycerol radical or glycerol radicals entering into each structural unit. It is to be noted that this clearly differentiates the herein contemplated compounds from those described in our co-pending application Serial No. 30,186, filed May 29, 1948 now Patent No. 2,576,285.

More specifically, the present invention relates to a water-miscible ester which is the resultant of the oxyethylation, with ethylene oxide, of a ricinoleic acid-polycarboxy acid-glycerol ester, which ester (a) contains at least one ricinoleic acid radical, at least one radical of a polycarboxy acid which is saturated and has not over 10 carbon atoms, and at least one glyceryl radical, the three types of radicals being joined by ester linkages, (b) contains less than three ricinoleic acid radicals for each glyceryl radical, and (c) is characterized by the presence of a hydroxyl radical reactive towards ethylene oxide, as distinguished from a ricinoleyl hydroxyl radical.

Briefly stated, the compounds herein contemplated may be obtained by oxyethylation of intermediates, which, in turn, may be obtained in the following manner:

(1) Reacting monoricinolein or diricinolein with a polycarboxy acid or anhydride;

(2) Reacting triricinolein with a polycarboxy acid or anhydride and then reacting the ester so obtained with glycerol or glycide so as to introduce two reactive hydroxyl radicals in the terminal carboxylic ester position;

(3) Reacting the polycarboxy acid with diglycerol, and then subsequently reacting such product with ricinoleic acid or with triricinolein, diricinolein or monoricinolein; and (4) A combination of the three preceding procedures or other equivalent methods.

The manufacture of such intermediate products is well known and described in numerous patents and elsewhere in the literature.

Having obtained sub-resinous polyesters or other intermediates of the kind described, such products are subjected to oxyethylation so as to give water-soluble or water-miscible products, and preferably, of sufficient solubility to give clear transparent solution.

It has been assumed that the reaction of a hydroxylated polyester having free carboxylic radicals with a polyethyleneglycol under various conditions would, in essence, result in a product substantially the same as that obtained by reacting with ethylene oxide, so as to result in the same stoichiometrical relationship. We have found that this is not the case and that the resultant products are significantly different in composition and are much more effective for a number of purposes, such as, for example, demulsification of petroleum emulsions, break inducers in the doctor treatment of sour hydrocarbons, etc.

Since this difference in composition involves the inherent nature of the reactants and resultants, it is deemed desirable to point out clearly the nature of the products herein contemplated when glycerol, ricinoleic acid, or derivatives of glycerol and ricinoleic acid are reacted with polycarboxy saturated acids having 10 carbon atoms or less, and particularly dicarboxy acids having 4 to 8 carbon atoms, such as succinic acid, adipic acid, diglycollic acid and phthalic acid. The anhydrides, of course, are the obvious equivalent of the acid, and include, among others, phthalic anhydride, maleic anhydride, citraconic. Other suitable acids include oxalic, tricarballylic, tartaric, azelaic, sebacic, etc. It is to be noted that none of these acids has more than 10 carbon atoms, as stated.

Previous reference has been made to our abandoned copending application Serial No. 666,820, filed May 2, 1946. If desired, products of the kind herein contemplated may be obtained from the triricinolein acidic fractional ester therein described by reacting such acidic fractional ester with glycerol, glycide, or methyl glycide, so as to provide a polyhydroxylated radical which can be subjected to oxyethylation, so as to introduce a plurality of polyglycol radicals, as distinguished from a single polyglycol radical contemplated in our aforementioned abandoned copending application Serial No. 666,819, filed May 2, 1946. For this reason, what is said immediately following is, in essence, a repetition of what is said in said aforementioned co-pending application in the description of such acidic fractional esters. In said application, the fractional esters are intended for use, without change or addition, for reaction with ethylene oxide, whereas, in the instant application, they are intended for use as intermediates, and only after further reaction, are they ready for combination with ethylene oxide.

A preferred intermediate may be obtained by esterification reaction between triricinolein and a polybasic carboxylic acid such as phthalic acid, followed by treatment with glycide or the equivalent. Ricinoleic acid may be indicated by the following formula:

$$CH_3(CH_2)_5.\overset{OH}{\underset{|}{C}}H.CH_2CH=CH(CH_2)_7.COOH$$

which may be conveniently abbreviated for many purposes to

HORCOOH

If HORCOO is the acyloxy group of ricinoleic acid, triricinolein may be represented by the formula

HORCOOCH$_2$
HORCOOCH
HORCOOCH$_2$

It contains the residue of the polyhydric alcohol glycerol which may be represented as

HOCH$_2$
HOCH
HOCH$_2$

Triricinolein readily esterifies with phthalic acid, and if three moles of phthalic anhydride are caused to react with one mole of triricinolein, an ester product will be obtained according to the following reaction:

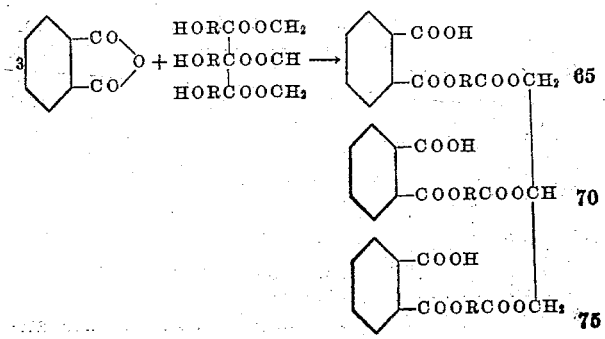

It is not necessary to use three moles of phthalic anhydride, for example, per mole of triricinolein, and if desired, one may use one or two moles, although the preference is to use approximately 2 to 2½ or 3 moles. In the esterification reaction above mentioned, and particularly, if conducted at relatively high temperatures, there may be some molecular rearrangement with the production of a compound which may be represented by the following formula:

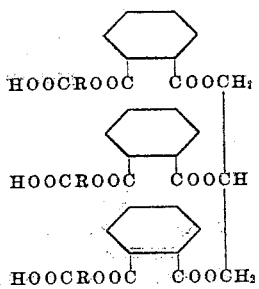

In carrying on the esterification reaction, there may develop cross-linkages either through the polyhydric alcohol or through the polybasic carboxylic acid, due to the polyfunctionality of these materials. For example, in an esterification reaction between triricinolein and phthalic acid, the resulting product may comprise more complex molecules, such as the following, which illustrates cross-linkages through the polyhydric alcohol residue:

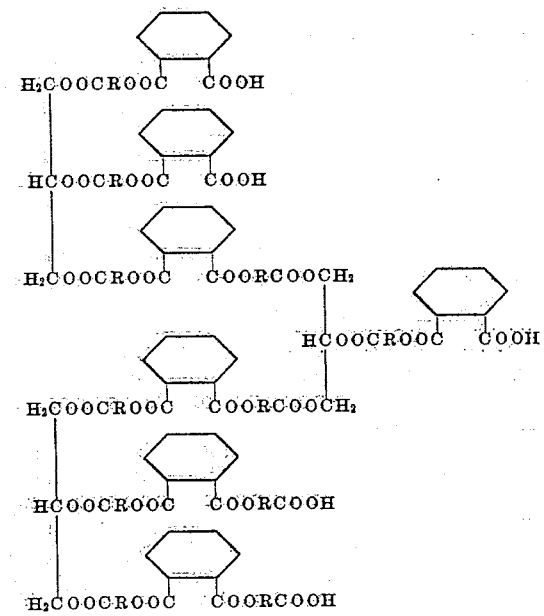

Cross-linkage, likewise, may occur through the polybasic carboxy acid to afford molecular structure, such as

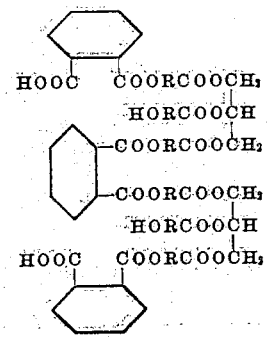

It is apparent that other cross-linkages may occur. Such ester products containing more complex molecules are also suitable. It is also apparent that there may be great variations in the molecular weight of the product. The molecular weight of the ester product, as determined by cryoscopic methods, or from obvious composition of the ester, usually runs between about 300 and about 4,000 and is seldom over 6,000. Ester products having a molecular weight over about 10,000, preferably are not employed. During the esterification reaction there may be some polymerization and polymerized products, as well as simple monomers may be used. The following examples will serve to illustrate the manufacture of raw materials, which can be converted into intermediates, and then can be subjected to oxyethylation.

TRIRICINOLEIN ACIDIC FRACTIONAL ESTER

Example 1

One-pound mole of triricinolein (in the form of castor oil which ordinarily contains approximately 85% to 95% triricinolein) is reacted with 2½ pound moles of phthalic anhydride to produce a mixture of acid phthalates consisting essentially of triricinolein dibasic phthalate and triricinolein tribasic phthalate. The reaction may be caused to occur by heating the mixed material at a temperature of approximately 120° to 140° C. for approximately 6 to 12 hours. The reaction can be followed, roughly, by withdrawing a small sample of the partially reacted mass and permitting it to cool on a watch crystal. When the reaction has become completed, no crystals of phthalic anhydride appear. When the sample no longer shows the presence of such crystals on cooling, it can be titrated with a standard volumetric alkaline solution, since the acid which remains is due entirely to carboxylic hydrogen in the fractional ester and not to any unreacted phthalic anhydride. If care is taken not to use too high temperatures which would cause formation of heterocyclic bodies of the character above referred to, one can depend upon the standard alkaline solution to indicate the disappearance of the phthalic anhydride. It is not to be inferred, however, that any cyclic bodies, if formed, would be unsuitable.

The product thus obtained, however, seems to consist largely of triricinolein dibasic phthalate and triricinolein tribasic phthalate. This fact is indicated by a molecular weight determination and also based on the acid value which usually runs from a little over 100 to slightly less than 110. Note that comparatively low temperatures of reaction are employed, so as to avoid rearrangement, as previously described.

TRIRICINOLEIN ACIDIC FRACTIONAL ESTERS

Example 2

The same procedure is followed as in the preceding example, without change, except that adipic acid or anhydride in equimolar amount is substituted for phthalic anhydride so as to give the corresponding adipic acid derivative, i. e., triricinolein dibasic adipate and triricinolein tribasic adipate.

TRIRICINOLEIN ACIDIC FRACTIONAL ESTERS

Example 3

The same procedure is followed as in the preceding example, without change, except that succinic acid or anhydride in equimolar amount is substituted for phthalic anhydride so as to give the corresponding succinic acid derivative, i. e., triricinolein dibasic succinate and triricinolein tribasic succinate.

TRIRICINOLEIN ACIDIC FRACTIONAL ESTERS

Example 4

The same procedure is followed as in the preceding example, without change, except that diglycollic acid in equimolar amount is substituted for phthalic anhydride to give the corresponding diglycollic acid derivative, i. e., triricinolein dibasic diglycollate and triricinolein tribasic diglycollate.

The products of esterification produced according to Examples 1 to 4, are viscous, yellowish or amber-colored, oily or sub-resinous materials resembling somewhat blown castor oil in consistency, and water-insoluble.

It is to be noted that the triricinolein acidic fractional esters herein contemplated as reactants are characterized by the fact that they are obtained by esterification reactions involving the use of at least one mole of the polycarboxy acid per mole of triricinolein. For instance, previous formulae indicate combinations wherein 1½ to 3 moles of phthalic anhydride are used per mole of triricinolein. In all instances, regardless of the ratio of polycarboxy reactant to triricinolein, there must be at least one free carboxyl per mole of triricinolein in the finished raw material, which is subjected to further reaction, as described. Such requirement is met, of course, by triricinolein monobasic phthalate derived from one mole of triricinolein and one mole of phthalic anhydride. Attention is also directed to the fact that all the fractional esters are prepared in such a manner that the final product is anhydrous. Having obtained such acidic fractional esters, they may be treated immediately with glycide or some equivalent, so as to introduce a dihydric terminal radical. The resultant is an intermediate which can then be subjected to oxyethylation.

As an example of such procedure involving the use of glycide, the following will serve.

GLYCIDE DERIVATIVE OF TRIRICINOLEIN ACIDIC FRACTIONAL ESTER

Example 1

650 pounds of triricinolein acidic fractional ester manufactured as described under the heading of Example 1, preceding, are mixed with one-half pound of sodium methylate and then reacted with extreme caution with a molecular equivalent of glycide (92 pounds) in three batches of approximately 30 to 31 pounds each. Such reaction involves extreme precaution and care for the reason that glycide sometimes reacts with almost explosive violence. A suitable procedure is as follows: To have the mixture of fractional ester and alkaline catalyst cold, add the glycide, cool to a temperature of under 15° C. and stir in the mass with the autoclave closed; after the two reactants are thoroughly mixed, the temperature is raised slowly until reaction takes place. As soon as reaction starts, the temperature is controlled. If possible, the temperature should be held at the initial reaction temperature or slightly above. Such reactions usually take place below 120° C. In any event, when the reaction is complete, the mass is again allowed to cool and the procedure repeated. The third batch is added in the same manner. Unless the reaction takes place with explosive violence or undue velocity, it is impossible that a temperature of over 140° C. is reached, and it is exceptional to register any pressure in excess of 100 to 200 pounds. Actually, such reaction may take place without even registering 100 pounds pressure. In any event, however, the reaction with glycide must be handled with extreme care. The product so obtained may be indicated by the following formula:

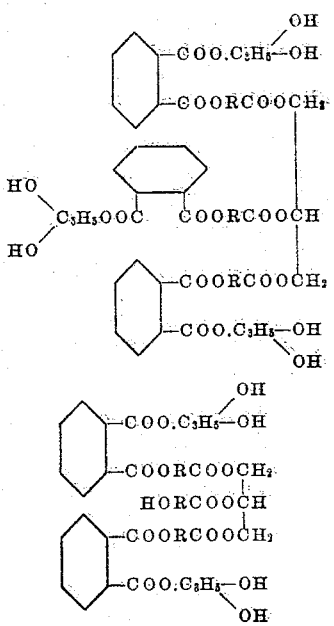

In some instances, it is more desirable to add glycide to a reactant which does not contain any free carboxyl radicals. For this reason, if one starts with the same amount of acidic fractional ester, as previously described, and first employs an equal molar amount of ethylene oxide (55 pounds) into approximately equal batches, then this intermediate product will be free from carboxylic radicals and usually glycide can be employed and a smoother reaction obtained than in the previous instance. Under such circumstances, the products obtained would be indicated by the following formula:

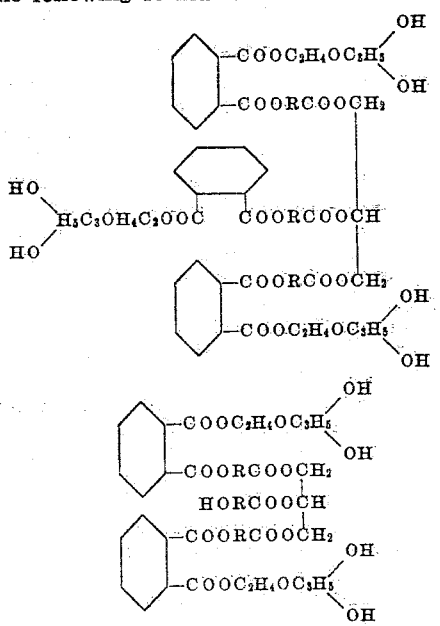

Such product in either instance can be subjected to oxyethylation so as to introduce two or more polyglycol radicals.

GLYCIDE DERIVATIVE OF TRIRICINOLEIN ACIDIC FRACTIONAL ESTER

Example 2

The same procedure can be followed as in Example 1, preceding, except that instead of using as a raw material triricinolein acidic fractional ester, Example 1, there is employed instead equimolal amounts of triricinolein acidic fractional ester exemplified by Examples 2 to 4, immediately preceding.

Other suitable examples of intermediates which may be subjected to oxyethylation in a manner subsequently described are obtained by reacting glyceryl monoricinoleate or glyceryl diricinoleate with phthalic anhydride or the equivalent. Such products may be illustrated by the following formula:

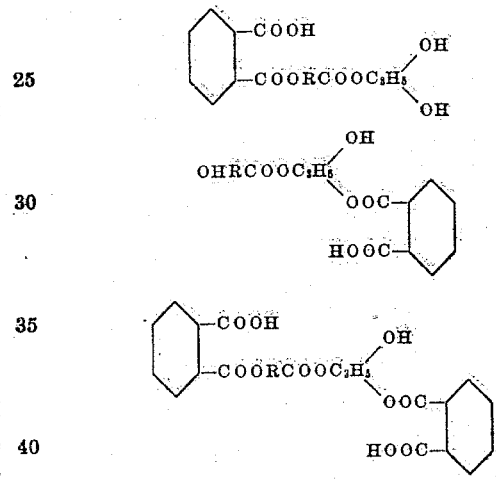

Previous reference has been made to the fact that triricinolein acidic fractional esters might be reacted with glycerol as well as with glycide. For example, one mole of a triglyceride such as triricinolein may be esterified with two moles of phthalic anhydride to produce diphthalated ricinolein which may be represented by the following formula:

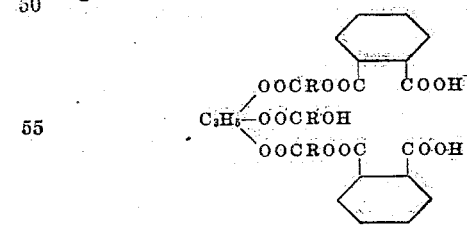

If one mole of the diphthalated triricinolein is then esterified with 2 moles of glycerol, the following product may be obtained:

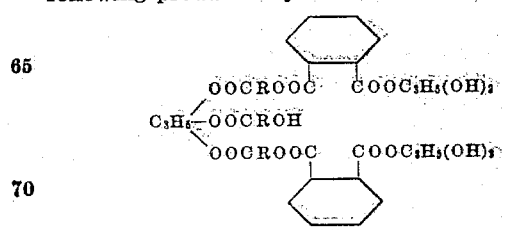

If 2 moles of diphthalated triricinolein are reacted with one mole of glycol, for example, a more complex molecule may be formed by cross-linkage through the glycol residue, as represented by the following formula:

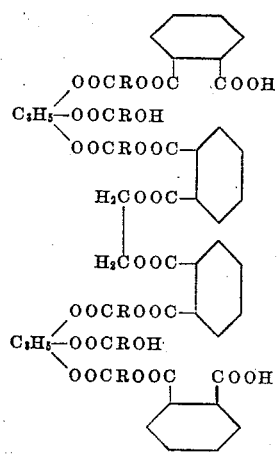

Various previous examples exemplify the introduction of a terminal radical having two hydroxyl groups. Thus, when such intermediates are subjected to oxyethylation, there is produced a branched chain polyglycol radical, or the equivalent thereof, with a plurality of polyglycol radicals. If a compound such as the following which has been previously described:

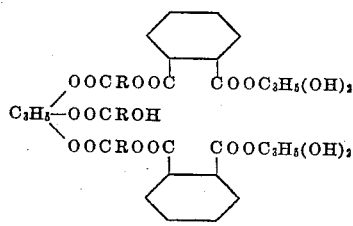

were reacted further with two additional moles of glycide, the result would be that three hydroxyls would be introduced in the terminal radical instead of two, as shown. Similarly, if such a product were treated with four moles of ethylene oxide and then with four moles of glycide, each terminal radical would have four hydroxyl radicals available for reaction with ethylene oxide. Thus, it is manifest that the procedure herein described or some obvious variant thereof, for instance, the use of acyclic diglycerol, or a suitable triglycerol, results in an introduction of a terminal radical having 2, 3 or 4 hydroxyl radicals. By way of illustration, consider the preceding formula and the change that is involved by the treatment of 4 moles of ethylene oxide and then with 4 moles of glycide. The structure of the resulting compound would be substantially as follows:

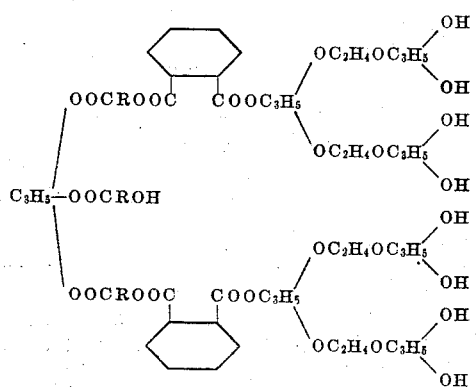

Another procedure suitable for the manufacture of intermediate products which may be subjected to oxyethylation so as to obtain compositions or compounds of the kind herein contemplated involves procedures similar to that used in the manufacture of modified polyester resins, one particular modification involves the use of ricinoleic acid compound only, and the products obtained are essentially sub-resinous and viscous liquids, rather than solids, but if solid, they are readily soluble in an inert solvent. The method of producing such materials is well known and involves an esterification reaction. The reactants employed are generally glycerol, castor oil, or ricinoleic acid, along with the polycarboxy acids, particularly the dicarboxy acids previously described. The esterification reaction may be caused to take place readily upon the application of heat, the reaction being more rapid the higher the temperature that is employed, but care should be taken not to employ excessively high temperatures, which would cause decomposition. The reaction may, if desired, be carried out in the presence of an inert solvent, such as xylene, which may be removed upon the completion of the reaction. When water is formed as a reaction product, the esterification reaction may be conducted under a reflux condenser, using a water trap to remove water as it is formed. The reaction can also be hastened by passing through the reacting materials a dried inert gas, such as nitrogen or $CO_2$. Generally speaking, however, the reactions take place rapidly, quickly, and completely, simply by heating substances to enter into the reaction in desired stoichiometric proportions at a temperature above the boiling point of water, usually, between about 110° and 160° C., provided there is no decomposition. The most desirable products are obtained by compositions in which the ratio of moles of polybasic carboxylic acid to moles of hydroxylated partial ester material reacted therewith, is within the ratio of 2 to 1 and 3 to 1. Such partial ester may consist of a mixture of diricinolein and monoricinolein. The molecular weight of the ester product, as determined by cryoscopic methods, or from the obvious composition of the ester product, usually runs between about 300 and about 4,000 and seldom is over 6,000. It may be mentioned that when the polybasic carboxylic acid is used in the anhydride form, esterification can take place without forming water as a reaction product, unless the second carboxyl radical is involved, and that the use of polybasic carboxy acid in anhydride form is normally preferable for this reason.

During the esterification reaction, there may be some polymerization, especially if conditions of esterification are prolonged. This polymerization is due primarily to formation of more complicated compounds from monomeric forms, through formation of ester linkage, with loss of water. It is to be understood that reference to ester products of the character herein referred to include possible polymerized forms, as well as simple esters or monomers.

The following are specific examples of the preferred intermediate products which can then be subjected to oxyethylation to give the final or ultimate composition.

RESINOUS POLYESTER INTERMEDIATE

*Example 1*

Mix 296 pounds of phthalic anhydride with 92 pounds of glycerol, and heat for approximately five to ten minutes at approximately 125° to 150° C., or longer, until a thin, clear, water-white liquid resin intermediate, containing no unreacted phthalic anhydride, has been produced. The resin intermediate is then mixed with 312 pounds of castor oil and the mixture is heated to from 150° C. to 250° C. for approximately ten to thirty minutes, or somewhat longer, if required, to complete reaction, after which it is permitted to cool and is diluted with from 10% to 20% of xylene or other inert solvent.

RESINOUS POLYESTER INTERMEDIATE

Example 2

The same procedure is followed as in the preceding example, without change, except that adipic acid in equivalent amount is substituted for phthalic anhydride so as to give the corresponding adipic acid derivative.

RESINOUS POLYESTER INTERMEDIATE

Example 3

The same procedure is followed as in the preceding example, without change, except that succinic acid in equivalent amount is substituted for phthalic anhydride so as to give the corresponding succinic acid derivative.

RESINOUS POLYESTER INTERMEDIATE

Example 4

The same procedure is followed as in the preceding example, without change, except that diglycollic acid in equivalent amount is substituted for phthalic anhydride so as to give the corresponding diglycollic acid derivative.

RESINOUS POLYESTER INTERMEDIATE

Example 5

One-pound mole of monoricinolein is reacted with two-pound moles of phthalic anhydride so as to produce an acidic fractional ester.

RESINOUS POLYESTER INTERMEDIATE

Example 6

One-pound mole of diricinolein is reacted with two-pound moles of phthalic anhydride so as to produce an acidic fractional ester.

RESINOUS POLYESTER INTERMEDIATE

Example 7

The same procedure is followed as in Examples 5 and 6, preceding, except that phthalic anhydride is replaced by various other preferred dicarboxy reactants in stoichiometrical amounts, such as adipic acid, succinic acid, or diglycollic acid.

Although, in light of what has been said previously, there appears to be a wide variety of intermediate products which may be subjected to oxyethylation to yield the composition herein contemplated, yet casual examination discloses a close relationship between all such intermediates. In each instance, such intermediates are polycarboxy derivatives, particularly dicarboxy derivatives of glyceryl esters of ricinoleic acid along with additional combined glycerol, if required, to insure a structure in which the total valencies of the glyceryl radical or radicals counting such radical as trivalent, is in excess of the number of ricinoleic acid radicals present, and also characterized by the presence of a reactive hydroxyl radical, other than the ricinoleyl hydroxyl radical. The following characterization differentiates such suitable intermediate from those described in our aforementioned co-pending application Serial No. 666,819, filed May 2, 1946, in that in the present instance, in any particularly monomeric or structural unit, the number of ricinoleic acid radicals present is less than the number of hydroxyl radicals originally available for esterification, and as a result of this difference, certain marked differentiation in structure appear, as, for example, the following:

(1) A dicarboxy radical may be directly attached to the residual glyceryl hydroxyl group, such as phthalated monoricinolein or phthalated diricinolein, where the phthalic acid residue is attached to the glyceryl radical, which is, in essence, attached in a terminal position;

(2) Or in an isomer of the previous type of compound, if the phthalic acid radical or its equivalent is attached to a ricinolein hydroxyl group, then and in that event, the residual glyceryl hydroxyl is susceptible to oxyethylation and again provides means for introducing a terminal polyglycol radical;

(3) The polyglycol radical introduced in the ricinoleyl radical, under any circumstances, instead of being a single long chain, may be considered as a branched chain polyglycol radical, or better still, as a plurality of polyglycol radicals having, as desired, from 2 to 4 hydroxyls, or may have variants in which more than one of these characteristic structures appear.

Generally speaking, oxyethylation is conducted in substantially the same manner as applied to a number of other products, in which the ethylene oxide group is introduced between an oxygen atom and a hydrogen atom, as, for example, in oxyethylation of high molal acids or high molal alcohols, substituted phenols, etc. Usually, a small amount of alkaline catalyst is added, such as one-tenth of 1% to 1% of caustic soda, sodium stearate, sodium methylate, or the like. Oxyethylation is conducted with constant stirring and a gauge pressure of 100 to 200 pounds per square inch is generally satisfactory. The temperature of reaction may be varied from 100° C. to less than 200° C. If desired, an inert solvent may be present, such as xylene, tetralin, cymene, decalin, or the like. The ethylene oxide may be used continuously, provided the addition is regulated so that it is used up more or less uniformly as it enters the reaction vessel or autoclave. Our preference, however, is to add the material batch-wise, as indicated, and continue oxyethylation not only until the product is distinctly hydrophile, but also until it gives a substantially clear solution in water. As to other oxyethylating procedure, attention is directed to the following United States patents and to the following British patent: U. S. Nos. 2,142,007, December 27, 1938, P. Schlack; 1,845,198, February 16, 1932, O. Schmidt et al.; 1,922,459, August 12, 1933, O. Schmidt et al.; British 302,041, August 7, 1928, J. Y. Johnson.

OXYETHYLATED WATER-SOLUBLE DERIVATIVE

Example 1

550 pounds of a sub-resinous compound exemplified by "Resinous Polyester Intermediate, Example 1" is mixed with one-half pound of sodium methylate and then reacted with approximately 175 pounds of ethylene oxide in three batches of 55 to 60 pounds each. The maximum pressure during the reaction is 135 pounds per square inch gauge pressure, along with a temperature of 140° C. The time of reaction required for each batch varies from 3 to 9 hours. If the molecular weight equivalent of the resinous raw material be considered as 1100, then the amount of ethylene oxide at this point represented roughly a molar ratio of 8 moles of ethylene oxide to one mole of intermediate. The resinous material, prior to oxyethylation, is water-insoluble and has an acid number of approximately 80.0. It has a hydroxyl number of approximately 45.3. After initial oxyethylation, as described, the product begins to show some hydrophile property, but does not give a suitable permanent solution and is definitely short of the point where a clear solution is produced. For this reason, it is then treated with approximately 200 pounds of additional ethylene oxide, using about 50 pounds per batch. Each one of the four treatments require approximately 10 hours for reaction, the maximum pressure being 130 pounds gauge pressure, as before, and the temperature somewhat higher than in the initial treatment, to wit, 140° to 150° C. The material, at the end of the second treatment, is definitely more water-miscible but gives a very definite cloudy solution which tends to separate. For this reason further oxyethylation is indicated. This third series of oxyethylations involve the addition of 220 pounds of ethylene oxide in four batches of 55 pounds each. The conditions of reaction are identical with these employed in the batch steps immediately preceding. The water-solubility of the derivative is markedly enhanced. In the last series of oxyethylations there is added 200 pounds of ethylene oxide in 4 portions of 50 pounds each. In the final series of batch treatments, less time is required, the ethylene oxide being absorbed in approximately 5 hours, and although the pressure continues in the same range as previously, the temperature employed is somewhat higher, to wit, 155° C. The product obtained is clearly water-soluble and gives an excellent and permanent solution. As the result of the above procedure, 550 pounds of sub-resinous material representing roughly one-half mole is combined with 795 pounds of ethylene oxide to give a final yield of 1345 pounds oxyethylated derivative. This represents 18 moles of ethylene oxide per each one-half mole of resin, or 36 moles of ethylene oxide per mole of resin. Figured as an increase in weight, there is added 796 pounds of ethylene oxide to 550 pounds of resin intermediate, or the amount of ethylene oxide added, based on the amount of resin intermediate used as a raw material, represents 144%. The appearance of the product was that of a deep amber-colored, non-viscous oil. The acid value of this product is 1.3. This product is further identified as L-12865.

OXYETHYLATED WATER-SOLUBLE DERIVATIVE

Example 2

The same procedure is followed as in the preceding example, except that the amount of ethylene oxide employed is increased by approximately one-sixth, so as to introduce 42 moles of ethylene oxide per mole of resin, in comparison with 36 moles in Example 1, immediately preceding. If the same amount of resin intermediate is used in the beginning of the reaction, for instance, 550 pounds, then after 795 pounds have been added in the manner described in Example 1, immediately preceding, there is an additional amount added equal to 135 pounds, which is conveniently employed in the form of three batches of 45 pounds each. These additions at this stage can be made with comparative ease, requiring only about 4 hours for each addition at a temperature of 155° C. with a maximum gauge pressure of 130 pounds per inch. At the completion of the reaction it means that 930 pounds have been added to 550 pounds of intermediate. The ethylene oxide added represents 169%, based on the resin intermediate as a raw material, and this compares with 144%, as in Example 1. Needless to say, the product gives a clear solution in water and the general appearance is the same as the preceding example.

OXYETHYLATED WATER-SOLUBLE DERIVATIVE

Example 3

The same procedure is employed as in the two previous examples, except that an even greater amount of ethylene oxide is added. In other words, if the product resulting from Example 2, immediately preceding, is considered as a raw material, there is added one more lot of ethylene oxide equivalent to 135 pounds in three batches of 45 pounds each, under the same conditions as described in Example 2, immediately preceding. This brings the ethylene oxide added to 48 moles per mole of resin, compared with 36 moles in Example 1, preceding, and 42 moles in Example 2, immediately preceding. This represents an addition of 1065 pounds of ethylene oxide to 550 pounds of original resin intermediate. This is equivalent to 193.5% based on the amount of intermediate used as a raw material. This figure compares with the 144% in Example 1 and 169% in Example 2. The three examples collectively give an excellent guide as to the amount of ethylene oxide to be added to produce the properties herein contemplated in the final compositions. In other words, approximately 140% to 200%, by weight, of ethylene oxide is added for the purpose of producing sufficient water-solubility in all the various intermediate resins.

OXYETHYLATED WATER-SOLUBLE DERIVATIVE

Example 4

The same procedure is applied to resin intermediates prepared in the manner described under the headings "Resinous Polyester Intermediate, Examples 2 to 6," inclusive, instead of the intermediate described under the heading "Resinous Polyester Intermediate, Example 1," which was employed as a raw material in the manufacture of "Oxyethylated Water-Soluble Derivative, Examples 1, 2 and 3," immediately preceding.

OXYETHYLATED WATER-SOLUBLE DERIVATIVE

Example 5

The same procedure is applied to "Glycide Derivative of Triricinolein Acidic Fractional Ester, Examples 1 and 2," instead of the intermediate described under the heading "Resinous Polyester Intermediate, Example 1," which was employed as a raw material in the manufacture of "Oxyethylated Water-Soluble Derivatives, Examples 1, 2 and 3," immediately preceding. In other words, 550 pounds of the glycide derivative is used to replace 550 pounds of the "Resinous Polyester Intermediate."

Products of value as demulsifying agents have been prepared by reacting acidic products of the kind previously described with polyhydric alcohols, although not necessarily with polyethylene glycols having a large number of repititious ether linkages in such proportion and manner as to render such products water-soluble or water-miscible.

Esterification with a polyethyleneglycol or the like cannot yield the same sort of product as treatment with ethylene oxide, where there is an alcoholic hydroxyl available for reaction. In the intermediate products herein contemplated for reaction with ethylene oxide to yield the final or ultimate compounds, there is present an alcoholic hydroxyl, usually the primary alcoholic hydroxyl of the glyceryl radical or a secondary alcoholic hydroxyl of the glyceryl radical which is susceptible to oxyethylation in contradistinction to the ricinoleyl hydroxyl radical. Ordinarily speaking, under conditions of reaction usually employed in the manufacture of such products as have been described, etherization does not take place. More specifically, the conventional conditions of reaction in which a hydroxylated compound is treated with a polyethylene glycol, does not yield an ether. For this particular reason, one would not expect treatment with ethylene oxide to yield the same sort of products as would be obtained by esterification. For this particular reason, the hereto attached claims are limited to products obtained by the oxyethylation of compounds in which there is present a reactive alcoholic hydroxyl radical, regardless of whether there be present or absent any free carboxylic radicals. This particular feature differentiates such products from those obtained by esterification from polyethylene glycols. Furthermore, attention has already been directed to the fact that the intermediates subjected to oxyethylation contain a number of ricinoleic acid radicals which is less than the number of hydroxyl radicals originally available for esterification, and thus, is differentiated from our co-pending application Serial No. 666,819, filed May 2, 1946. Attention also is directed to other certain differences in the reactants obtained by treatment with ethylene oxide and esterification reactions involving a polyethylene glycol. Oxyethylation is conducted in absence of water. It is generally conducted at temperatures distinctly under 200° C. In fact, this temperature may be taken as the upper limit; unless a catalyst is added, esterification reactions may require much higher temperatures, for instance, from 295° to 335°. This difference may be illustrated by employing any one of the typical intermediates herein described, for instance, "Resinous Polyester Intermediate, Example 1." In other words, if one reacts a predetermined amount so that the result would be comparable to the products described under the heading "Oxyethylated Water-Soluble Derivative, Example 1," it is possible to make some appraisal of the difference in reaction and resultant, depending upon which of the two precedures is employed.

An examination of such reactions is best conducted on a laboratory scale. In other words, if one starts with approximately 552 grams of the mixture described under the heading "Resinous Polyester Intermediate, Example 1," and having an acid value of approximately 80.6 and a hydroxyl value of approximately 45.3 and adds thereto equivalent of approximately 2 moles of a polyethylene glycol having approximately 10 to 11 structural units, then on completion of the reaction one would anticipate that there would be a drop in acid value to approximately zero, corresponding to the acid value of the product described under the heading "Oxyethylated Water-Soluble Derivative, Example 1," along with the elimination of a stoichiometric amount of water, which would be equivalent to 14¼ grams.

Such reaction can be conducted in any one of three ways: (a) Absence of a catalyst; (b) presence of an acid catalyst; or (c) presence of a basic catalyst. Actually, there is little or no justification for using a basic catalyst, for the reason that under such circumstances, one would not expect to obtain a product comparable to that described under the heading "Oxyethylated Water-Soluble Derivative, Example 1," but would expect to get a product in which transesterification which is sometimes referred to as ester interchange or alcoholysis, would take place. (See Organic Chemistry, Fieser and Fieser, 1944, page 182; and Organic Chemistry, Fuson and Snyder, 1942, page 92.)

In conducting these exploratory experiments, it becomes obvious that the two points do not coincide, i. e., the production of water of reaction and reduction of the acidity to the value of one or two. In each instance, an attempt was made to carry the reaction to the end point indicated both ways. In the case of the acid catalyst, one-half percent p-toluene sulfonic acid was added. In connection with the polyethylene glycol reactant, attention is directed to the article entitled "Technology of the polyethyleneglycols and carbowax compounds," Chemical and Engineering News, volume 23, No. 3, page 247 (1945). Such article points out, among other things, why the value of $n$, as herein contemplated, represents an average value, rather than specific value, for a single compound. The result of these experiments are indicated by the following table:

|  | Experiment A L-24145 | Experiment B L-24146 | Experiment C L-24147 |
| --- | --- | --- | --- |
| Resinous Polyester, Intermediate Example 1. | 552 grams, Acid v.=80.6. | 552 grams, Acid v.=80.6. | 552 grams, Acid v.=80.6. |
| $HO(C_2H_4O)_nH$ $n$=10 or 11 | 792 grams | 792 grams | 792 grams. |
| Catalyst | None | ½ Per Cent Toluene Sulfonic Acid. | ½ Per Cent Sodium Methylate. |
| Acid v. of Mixture | 32.2 | 32.4 | 30.0. |
| Conditions to bring acid value to about 2. |  |  |  |
| Time | 6 hours | 6 hours | 6 hours. |
| Maximum Temperature | 335° C | 285° C | 315° C. |
| Water eliminated at this point. | 100 cc. (24 cc. oil) | 160 cc. | 40 cc. (12 cc. oil) |
| Remarks | Aqueous milky solution. | Aqueous milky solution. | Aqueous milky solution. |
| Conditions to bring about elimination of 14¼ g. water (theoretical): |  |  |  |
| Time | 1½ hours | 1 hour | 3 hours. |
| Maximum Temperature | 295° C | 215° C | 300° C. |
| Acid v. at this point | 30.1 | 21.5 | 12.65. |
| Remarks | Clear oil; cloudy solution with water. | Clear oil; cloudy solution with water. | Clear oil; cloudy solution with water. |

In comparison with Experiments A, B and C, it has been pointed out previously that the resinous polyester intermediate can be treated with ethylene oxide at comparatively low temperature, for instance, 140° C. in absence of water to give a product which is clearly water-soluble and which has an average molecular weight approximately equivalent to that of products obtained in Experiments A, B and C, provided there was complete chemical combination. The acid value of the oxyethylated derivative was approximately 2.

In examining Experiments A, B and C, it is to be noted that it was impossible to reduce the acid value in any one of the three cases to that obtainable by oxyethylation, to wit, a value of 2. Actually, the values vary from 12 to 20. Furthermore, the theoretical amount of water which would be expected to be eliminated in Experiments A, B and C so as to give a product identical to what previously referred to as Example 1, would be 14¼ grams of water. Actually, when 14¼ grams of water had been eliminated in all three cases, the acid value varied from 12 to approximately 33. On the other hand, when the minimum acid value was obtained, even though it did not approach the value of 2, the amount of water eliminated was a great deal more than theory, varying from 40 cc. including 12 cc. of an oil liquid to 160 cc. and in one instance there was an elimination of 100 cc. of water along with 24 cc. of oily liquid. Furthermore, in order to obtain the results indicated, instead of using a temperature of approximately 140° C. or somewhat higher, but in any event, under 200° C., the temperature actually varied from 215° C. to 335° C. Attention is directed to a very significant fact, and that is, that these temperatures employed in Experiments A, B and C, as previously noted, are within the range which may result in rearrangements. This is particularly true in the presence of catalysts. Furthermore, it is to be noted that the above experiments and the analytical values included are not concerned with an oxyethylation of a reactive alcoholic hydroxyl. It will be noted that the herewith appended claims are all concerned with intermediates, in which there is present prior to oxyethylation a reactive alcoholic hydroxyl which is part of a polyhydric alcohol radical, as differentiated from a ricinoleyl hydroxyl radical which apparently is not reactive towards ethylene oxide under the circumstances employed.

The difference in the nature of the products obtained by the two different procedures is illustrated further by their effect upon emulsions. The following table shows results obtained by adding an equal amount of the same four materials to certain emulsions, one emulsifying agent consisting of the product described under the heading "Oxyethylated Water-soluble Derivative, Example 1," and the other three consisting of the clear oils obtained as resultants from Experiments A, B and C, described previously in tabular form. Here again it is to be noted that, although the results indicated are concerned with merely one particular derivative, i. e., phthalic acid derivatives, the results are the same as far as demulsification when other polycarboxy acid derivatives are examined the same way. This is particularly true of adipic acid, succinic acid, diglycollic acid, etc.

DEMULSIFYING TEST NO. 1

| | |
|---|---|
| Date of test | Oct. 30, 1945 |
| State of | California |
| Oil field | Oak Canyon |
| Oil company | Wickham |
| Lease | No. 4 |
| Well | No. 4 |
| Percent emulsion in fluid from well | 51.0 |
| Percent free water in fluid from well | Trace |
| Percent water obtained by complete demulsification | 46 |
| Percent demulsifier in test solution | 2½ |
| Temperature of tests | 140° C. |
| Period of agitation after adding demulsification | 5 min. |
| Nature of agitation; machine with shaker arm; shakes per minute | 130 |
| Ratio of demulsifier to well fluid | 1:6700 |

| | L-24145 | L-24146 | L-24147 | L-12865 | Blank |
|---|---|---|---|---|---|
| Time test started: 2:45 c. c. water out at— | | | | | |
| 3:10 (10/31) | 22 | 16 | 3 | 41 | Trace. |
| 5:00 (10/31) | 32 | 31 | 16 | 42 | Do. |
| 8:15 (10/31) | 36 | 35 | 27 | 43 | Do. |
| 8:50 (11/1) | 38 | 37 | 28 | 43 | Do. |
| 9:15 (11/2) | 39 | 38 | 30 | 43 | Do. |
| 9:15 (11/2) | 40 | 40 | 32 | 43 | Do. |

DEMULSIFYING TEST NO. 2

| | |
|---|---|
| Date of test | Dec. 13, 1945 |
| State of | California |
| Oil field | Wilmington |
| Oil company | Royalty Service |
| Lease | Santa Fe |
| Well | B-2 |
| Percent emulsion in fluid from well | 21.0 |
| Percent free water in fluid from well | Trace |
| Percent water obtained by complete demulsification | 18.0 |
| Percent demulsifier in test solution | 2½ |
| Temperature of tests | 160° F. |
| Period of agitation after adding demulsification | 5 min. |
| Nature of agitation; machine with shaker arm; shakes per minute | 130 |
| Ratio of demulsifier to well fluid | 1:5000 |

|  | L-24145 | L-24146 | L-24147 | L-12865 | Blank |
|---|---|---|---|---|---|
| Time test started: 10:30 c. c. water out at— |  |  |  |  |  |
| 1:25 |  |  |  |  | Trace. |
| 2:45 | Trace | Trace | Trace | 8 | Do. |
| 5:00 | Trace | Trace | Trace | 12 | Do. |
| 8:35 (12/14) | 3 | 4 | 2 | 15 | Do. |
| 4:50 | 3 | 5 | 3 | 15 | Do. |
| 8:05 (12/15) | 4 | 6 | 3 | 15 | Do. |
| 9:10 (12/17) | 7 | 7 | 7 | 16 | Do. |

DEMULSIFYING TEST NO. 3

| | |
|---|---|
| Date of test | Dec. 13, 1945 |
| State of | California |
| Oil field | Wilmington |
| Oil company | Royalty Service |
| Lease | Santa Fe |
| Well | B-1 |
| Percent emulsion in fluid from well | 24.0 |
| Percent free water in fluid from well | 0.3 |
| Percent water obtained by complete demulsification | 22.0 |
| Percent demulsifier in test solution | 2½ |
| Temperature of tests | 160° F. |
| Period of agitation after adding demulsifier | 5 min. |
| Nature of agitation; machine with shaker arm; shakes per minute | 130 |
| Ratio of demulsifier to well fluid | 1:5000 |

|  | L-24145 | L-24146 | L-24147 | L-12865 | Blank |
|---|---|---|---|---|---|
| Time test started: 10:50 c. c. water out at— |  |  |  |  |  |
| 1:25 | Trace | Trace | Trace | 10 | Trace. |
| 2:45 | Trace | Trace | Trace | 14 | Do. |
| 5:00 | Trace | Trace | Trace | 16 | Do. |
| 8:35 (12/14) | 3 | 5 | 3 | 17 | Do. |
| 4:50 | 3 | 5 | 3 | 19 | Do. |
| 8:05 (12/15) | 5 | 6 | 4 | 19 | Do. |
| 9:10 (12/17) | 8 | 8 | 7 | 20 | Do. |

It may be desirable to point out that distillable polyglycols of the kind previously referred to and exemplified by nonaethyleneglycol or the like, and particularly those having 8 to 12 oxyalkylated groups, are sometimes referred to as "upper distillable ethyleneglycols." (See U. S. Patent No. 2,324,489, dated July 20, 1943, to De Groote and Keiser.)

It is of considerable interest to compare compounds of the kind herein described with somewhat analogous compounds described elsewhere in the literature or prepared from data appearing elsewhere. The reagents employed, for example, ricinoleic acid, glycerol, ethylene oxide, phthalic anhydride, etc., can be considered as building blocks or structural units which can be fitted together to give various compounds. Castor oil (triricinolein) may be considered as ricinoleic acid and glycerol in combination.

Some such other structures may be exemplified by examples which appear in the series of U. S. Patents Nos. 2,295,163 through 2,295,170, inclusive, all dated September 8, 1942, to De Groote and Keiser. Briefly stated, a polyglycol acid ester such as nonaethyleneglycol dihydrogen dimaleate, or dihydrogen diphthalate, obtained by reaction between one mole of nonaethyleneglycol and two moles of an appropriate dicarboxy acid or anhydride, is reacted with various hydroxylated compounds, including triricinolein, diricinolein, monoricinolein, etc.

The following table briefly describes four such compounds, the first being an ethylene oxide compound of the kind herein specified. In the next three compounds, or products, an ethylene polyglycol is used instead of ethylene oxide. The compounds were prepared in an effort to have the ultimate composition of the last three compounds approximate with, or identical to that of the first compound, in terms of structural units.

Needless to say, as has been pointed out already, such resemblance is only superficial for the reason that, depending on the temperature of reaction, order in which reactants are added, and the very nature of the possible reactions themselves, one does obtain products which are inherently and intrinsically different in molecular structure, size of molecule, etc.

It is well to recall that the use of compounds of the kind herein described for the purposes involving surface activity, particularly demulsification, does not involve chemical reactivity in the ordinary sense. Surface activity, and particularly surface activity phenomena as exemplified by demulsification, is concerned with the actual shapes and sizes of molecules. Such concept, even though obscure and difficult to define, acquires a large degree of reality and value in an invention of the kind herein specified even though it is difficult to set forth such qualities in measures which are more concise and specific than those which have been included.

Only a few examples need be repeated at this point to emphasize these differences which, in our opinion, are related to the sizes, shapes, and association of molecules, and especially at interfaces. If phthalated castor oil is reacted with ethylene oxide, one builds up a derivative of the type in which there is always a residual hydroxyl, for the reason that ethylene oxide acts like a monofunctional reactant. If one substitutes a glycol for ethylene oxide, then one is employing a difunctional reactant, and one mole of a glycol can act as a coupling reagent to unite two moles of phthalated castor oil. Likewise, with the glycol and a glyceride, or any ester including a phthalated acid ester, alcoholysis can and usually does take place, particularly at elevated temperatures. This is not true in the case of ethylene oxide.

| Identifying Number of Compound | Reactants and how made | Per Cent of Ricinoleyl radical (RCO) in final product | Per Cent phthalyl radical in final product 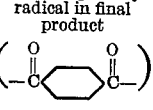 | Per Cent glycerol residue in final product ($C_3H_5$) | Per Cent $C_2H_4O$ radicals in final product |
|---|---|---|---|---|---|
| L-24632 | Castor oil 1 mole, Glycerine 1 mole, phth. anhyd. 3 moles. Heat the C. O. and glyc. to 260° C. and add the phth. Add EtO (150° C.). | 16.42 | 16.42 | 2.26 | 61.2 |
| L-24649 | Phth. anhyd. 0.2 mole plus glycerol 1 mole. Heat at 150° C. Castor oil 1/30 mole. Heat at 250° C. Polyglycol (m. w. 770). Heat at 200° C. | 13.45 | 13.40 | 2.5 | 65.5 |
| L-24648 | Polyglycol 1540 0.1 mole plus phth. anhyd. 0.2 mole plus glyceryl monoricinoleate 0.1 mole plus glycerine 1/30 mole heated at 240° C. | 13.25 | 13.40 | 2.9 | 65.5 |
| L-24647 | Phth. anhyd. 0.2 mole plus glycerol 0.1 mole heated at 125-150° C. for 10 min. plus castor oil .033 mole heated at 250° C. for ½ hr. Polyglycol 1540 0.1 mole heated at 210° C. | 13.30 | 13.2 | 2.5 | 65.5 |

In examining the above table it will be noted that all radicals shown do not add to quite 100%. The reason is that some connective oxygen atoms are not included, particularly those attached to glycerol and that, in some instances, there may have been elimination of water which affected the final percentage.

Attention is again directed to the fact that L-24632 typifies a compound of the kind herein described. In L-24649 the combination was so prepared that polyethyleneglycol having a molecular weight of 770 was employed to replace the ethylene oxide in an effort to get a somewhat analogous structure. In L-24648 a polyethyleneglycol having a molecular weight of 1540 was reacted with two moles of phthalic anhydride in a manner comparable to that described in a series of patents previously referred to, to wit, U. S. Patents 2,295,163 through 2,295,170. In L-24647 the polyglycol having a molecular weight of 1540 was added in a final stage without any attempt to combine previously with phthalic anhydride.

In addition to the four compounds above described, i. e., one derived by the use of ethylene oxide and the others by the use of a polyethyleneglycol, it is obvious that other compounds could be made, including the use of an alkoxy polyethyleneglycol. For instance, one could introduce a residue from a monohydric alcohol, such as a methyl alcohol, ethyl alcohol or propyl alcohol, etc., into a glycol. Such alkyl radical is introduced rather easily by simply substituting the monohydric alkyl ester of a glycol for the dihydric glycol. A suitable compound could be obtained by treating methyl or ethyl alcohol with ethylene oxide so as to give an ether glycol having a single hydroxyl and a molecular weight comparable to the molecular weight of the glycol previously described, that is, 770 and 1540.

However, removing a terminal hydroxyl radical prevents association and produces all sorts of changes which differentiate derivatives of alkoxy polyethyleneglycols from the corresponding derivatives of the polyethyleneglycols themselves. This is illustrated by noting the comparative wetting efficiencies (which properly in turn are related to surface activity) in the case of some of the simpler polyglycol fatty acids and a selected alkoxy derivative.

| Wetting Agent | Concentration (g. per 100 c. c.) for 25 sec. wetting at 25° C. |
|---|---|
| Methoxy polyethylene glycol m. w. 550 laurate | .066 |
| Polyethyleneglycol m. w. 1000 dilaurate | .140 |
| Polyethyleneglycol m. w. 400 monolaurate | .160 |
| Polyethyleneglycol m. w. 400 dilaurate | .220 |
| Polyethyleneglycol m. w. 400 mono-oleate | 1.550 |
| Polyethyleneglycol m. w. 600 mono-oleate | 2.250 |

As to compounds or mixtures involving the use of alkoxy polyethyleneglycol plus castor oil and a dicarboxy acid, see U. S. Patent No. 2,081,266 dated May 25, 1937, to Bruson. Compounds of this type, when compared with L-24632, do not show nearly the comparative effectiveness as a demulsifier, or for other purposes, such as use as a break inducer in the treatment of sour hydrocarbons.

The above compounds were then tested for demulsification on a number of typical emulsions. Some of the tests are as follows:

DEMULSIFYING TEST NO. 4

| | |
|---|---|
| Date of test | April 2, 1948 |
| State of | California |
| Oil field | Wilmington |
| Oil company | Atlantic |
| Lease | #11 |
| Well | #11 |
| Per cent emulsion in fluid from well | 22 |
| Per cent water obtained by complete demulsification | 18 |
| Per cent free water in fluid from well | |
| Per cent demulsifier in test solution | See values in table |
| Temperature of tests | 100° F. |
| Period of agitation after adding demulsifier | 5 min. |
| Nature of agitation; machine with shaker arm; shakes per minute | 130 |
| Ratio of demulsifier to well fluid | 1:10,000 1:20,000 (see below) |

| Per Cent Demulsifier | L-24632 1/20,000 | L-24647 1/10,000 | L-24648 1/10,000 | L-24649 1/10,000 | Blank |
|---|---|---|---|---|---|
| Time test started 10:20 c. c. water out at— | | | | | |
| 1:30 (4/2) | 7 | 4 | 4 | 4 | Trace. |
| 4:45 (4/2) | 9 | 5 | 5 | 5 | Do. |
| 12:35 (4/2) | 11 | 6 | 8 | 6 | Do. |
| 10:45 (4/3) | 11 | 6 | 8 | 7 | Do. |
| 11:00 (4/4) | 13 | 7 | 9 | 8 | Do. |

DEMULSIFYING TEST NO. 5

| | |
|---|---|
| Date of test | March 29, 1948 |
| State of | California |
| Oil field | Signal Hill |
| Oil company | Shell |
| Lease | Andrews |
| Well | No. 9 |
| Per cent emulsion in fluid from well | 22 |
| Per cent free water in fluid from well | 8 |
| Per cent water obtained by complete demulsification | 28 |
| Per cent demulsifier in test solution | See values in table |
| Temperature of tests | 90° F. |
| Period of agitation after adding demulsifier | 3 min. |
| Nature of agitation; machine with shaker arm; shakes per minute | 130 |
| Ratio of demulsifier to well fluid | 1:20,000 |

| Per Cent Demulsifier | L-24632 1/20,000 | L-24647 1/20,000 | L-24648 1/20,000 | L-24649 1/20,000 | Blank |
|---|---|---|---|---|---|
| Time test started 10:40 c. c. water out at— | | | | | |
| 1:20 (3/29) | 7 | 2 | 2 | 3 | Trace. |
| 4:45 (3/29) | 9 | 5 | 5 | 6 | Do. |
| 8:15 (3/30) | 14 | 7 | 6 | 8 | Do. |
| 5:00 (3/30) | 15 | 9 | 9 | 10 | Do. |
| 9:00 (3/31) | 25 | 11 | 11 | 11 | Do. |

DEMULSIFYING TEST NO. 6

| | |
|---|---|
| Date of test | March 29, 1948 |
| State of | California |
| Oil field | Kettleman Hills |
| Oil company | KNDA |
| Lease | 54-28-J |
| Well | 54-28-J |
| Per cent emulsion in fluid from well | 72 |
| Per cent free water in fluid from well | 4 |
| Per cent water obtained by complete demulsification | 60 |
| Per cent demulsifier in test solution | See values in table |
| Temperature of tests | 90° F. |
| Period of agitation after adding demulsifier | 5 min. |

DEMULSIFYING TEST NO. 6—Continued

| | |
|---|---|
| Nature of agitation; machine with shaker arm; shakes per minute | 130 |
| Ratio of demulsifier to well fluid | 1:20,000 |

| Percent Demulsifier | L-24632 1/20,000 | L-24647 1/20,000 | L-24648 1/20,000 | L-24649 1/20,000 | Blank |
|---|---|---|---|---|---|
| Time test started: 11:00 c. c. water out at— | | | | | |
| 1:25 (3/29) | | | | | Trace. |
| 4:50 (3/29) | | | | | Do. |
| 8:20 (3/30) | 35 | | | | Do. |
| 5:00 (3/30) | 50 | | | | Do. |
| 9:00 (3/31) | 50 | | 35 | | Do. |
| 8:15 (4/1) | 53 | | 45 | | Do. |
| 2:35 (4/1) | 53 | 1 | 47 | | Do. |

In addition to the foregoing demulsifying tests, the same four compounds identified as L-24632, L-24647, L-24648 and L-24649, have been tested on other emulsions with comparable differences. For sake of brevity these other tests are omitted but they include, among others, a test on an oil from the Wood Lease Well No. 2, Stanolind Oil and Gas Company, South Houston Field, located near Houston, Texas, a number of wells located on the properties of the Texas Company at West Columbia, Texas, etc.

These series of tests reveal that the compound obtained by the use of ethylene oxide was 35% to 65% better in numerous instances, and not infrequently was 100% better.

What has been said previously in regard to the structure of compounds which appear to be analogous at first superficial examination, should be reconsidered in light of the previous description of L-24632, L-24647, L-24648 and L-24649, together with the foregoing tests. The same sorts of differences would be shown in other comparable tests where surface activity is concerned with the industrial application, as for instance, break induction in doctor treatment of sour hydrocarbons. The fact that there is a similarity, in fact, almost an identity of structure, when measured in terms of acid radicals, ethylene oxide radicals, etc., does not mean that the size of molecules is the same for the obvious reason that the same materials of construction yield architecturally different products.

In the hereto appended claims the word "water-miscible" is employed to designate a sol or solution which is permanent for either an indefinite period of time, or for such extended period of time as would unquestionably permit its utilization for the herein designated purposes without undue difficulties.

Attention is directed to the fact that, although it is specified that the intermediates herein contemplated for reaction with ethylene oxide must have a reactive hydroxyl radical, as differentiated from a hydroxyl radical which is part of the ricinoleyl radical, it is to be emphasized that there may also be present a free carboxyl radical. This is exemplified by compounds such as diricinolein monophthalate, diricinolein diphthalate, monoricinolein monophthalate, monoricinolein diphthalate, or similar compounds derived from other dicarboxy or tricarboxy acids. Naturally, such carboxyl radical is converted in the early stages of oxyethylation into a terminal radical having reactive hydroxyl radicals, i. e., capable of further reaction with ethylene oxide. The acid value of the reactant subjected to oxyethylation may vary from zero, in the case of the glycide derivatives of triricinolein acidic fractional ester previously described, to values of 168 or somewhat higher. The latter value happens to be the acid value for monoricinolein diphthalate. Naturally, this value would increase if a dicarboxy acid of lower molecular weight than phthalic acid were employed, and would also increase markedly if a tricarboxy acid such as citric acid were employed, as, for example, in the case of monoricinolein dicitrate formed by the reaction of one citric acid carboxyl only.

The hydroxyl values of the reactants prior to oxyethylation may vary widely, as is obvious by consideration of some of the formulae or suggested examples. In the case of monoricinolein monophthalate, the value woulud be 216, whereas, in numerous other compounds illustrated, the value would be as low as 25. The value for resinous polyester intermediate, Example 1, described previously, is approximately 40. The acid value, it is noted in that particular instance, is 80.

The preferred ultimate materials are those exemplified by "Oxyethylated Water-soluble Derivatives, Examples 1, 2 and 3." These are obtained, in turn, from Resinous Polyester Intermediates, Example 1. The preferred type of reactant, prior to oxyethylation, will show a hydroxyl value varying from 25 to 100 and an acid value from 40 to 125. The acid value of the final product is, of course, zero, or substantially zero, for the reasons previously stated, to wit, that all carboxy radicals are converted into hydroxyl radicals. The hydroxyl value of the final product can be calculated by adding the acid value to the hydroxyl value of the reactant prior to oxyethylation and then allowing for increase in weight, due to oxyethylation. Thus, in the case of an intermediate having an acid value of approximately 80 and a hydroxyl value of approximately 40, and if the amount of ethylene oxide added is sufficient to double the weight of the original reactant, then the final hydroxyl value will be approximately 60 and the acid value will be approximately zero.

The products herein described, and particularly for use as demulsifying agents, may be considered as intermediates for further reaction. For example, they may be reacted with chloroacetic acid or similar low molal alpha-halogenated carboxy acid to produce an ester. Such ester will serve many of the purposes herein described, i. e., as a demulsifier, break inducer, etc. Such alpha-halogenated carboxy acid ester may be reacted further, for example, with a tertiary amine, such as dimethyldodecylamine, esterified triethanolamine, in which the acyl radical is derived from a detergent-forming monocarboxy acid, and from hydroxylated amines, obtained, for example, by reaction with high molal amines, such as octadecylamine with two moles of ethylene oxide. Such compounds or derivatives again can be employed for all of the various purposes herein indicated, and particularly for demulsification.

The word "miscible" is frequently used to mean soluble in all proportions. In a technical sense, it is sometimes employed to mean soluble without necessarily meaning in all proportions, and such solubility may include a colloidal dispersion or sol, as well as molecular solution. The word "water-miscible" is employed in the hereto appended claims in this more restricted meaning.

Having thus described our invention, what we claim and desire to secure by Letters Patent is:

1. A water miscible ester which is the resultant of the oxyethylation, with ethylene oxide, of a ricinoleic acid-polycarboxy acid-glycerol ester, which ester (a) contains at least one ricinoleic acid radical, at least one radical of a polycarboxy acid which is saturated and has not over 10 carbon atoms, and at least one glyceryl radical, the three types of radicals being joined by ester linkages, (b) contains less than three ricinoleic acid radicals for each glyceryl radical, and (c) is characterized by the presence of a hydroxyl radical reactive towards ethylene oxide, as distinguished from a ricinoleyl hydroxyl radical.

2. The product as in claim 1 in which the polycarboxy acid is dicarboxy.

3. The product as in claim 2 in which the dicarboxy acid has at least 4 and not more than 8 carbon atoms.

4. The product as in claim 3 in which the ricinoleic acid-dicarboxy acid-glycerol ester has an acid value within the limits of 40 to 125.

5. The product as in claim 4 in which the ricinoleic acid-dicarboxy acid-glycerol ester has a hydroxyl value within the limits of 25 to 100.

6. The product as in claim 5 in which the weight of ethylene oxide added by reaction based on the weight of the ricinoleic acid-dicarboxy acid-glycerol ester prior to oxyethylation is within the range of 140% to 200%.

7. The product as in claim 6 in which the dicarboxy acid is phthalic acid.

8. The product as in claim 6 in which the dicarboxy acid is diglycollic acid.

9. The product as in claim 6 in which the dicarboxy acid is adipic acid.

MELVIN DE GROOTE.
BERNHARD KEISER.

REFERENCES CITED

The following references are of record in the file of this patent:

UNITED STATES PATENTS

| Number | Name | Date |
|---|---|---|
| 2,353,695 | De Groote | July 18, 1944 |